Dec. 19, 1961  E. L. WOODS  3,014,137
POWER AMPLIFIERS EMPLOYING SATURABLE REACTORS
Filed Oct. 17, 1958  7 Sheets-Sheet 1

INVENTOR.
ELVIN L. WOODS
BY

Dec. 19, 1961   E. L. WOODS   3,014,137
POWER AMPLIFIERS EMPLOYING SATURABLE REACTORS
Filed Oct. 17, 1958   7 Sheets-Sheet 2

INVENTOR.
ELVIN L. WOODS
BY

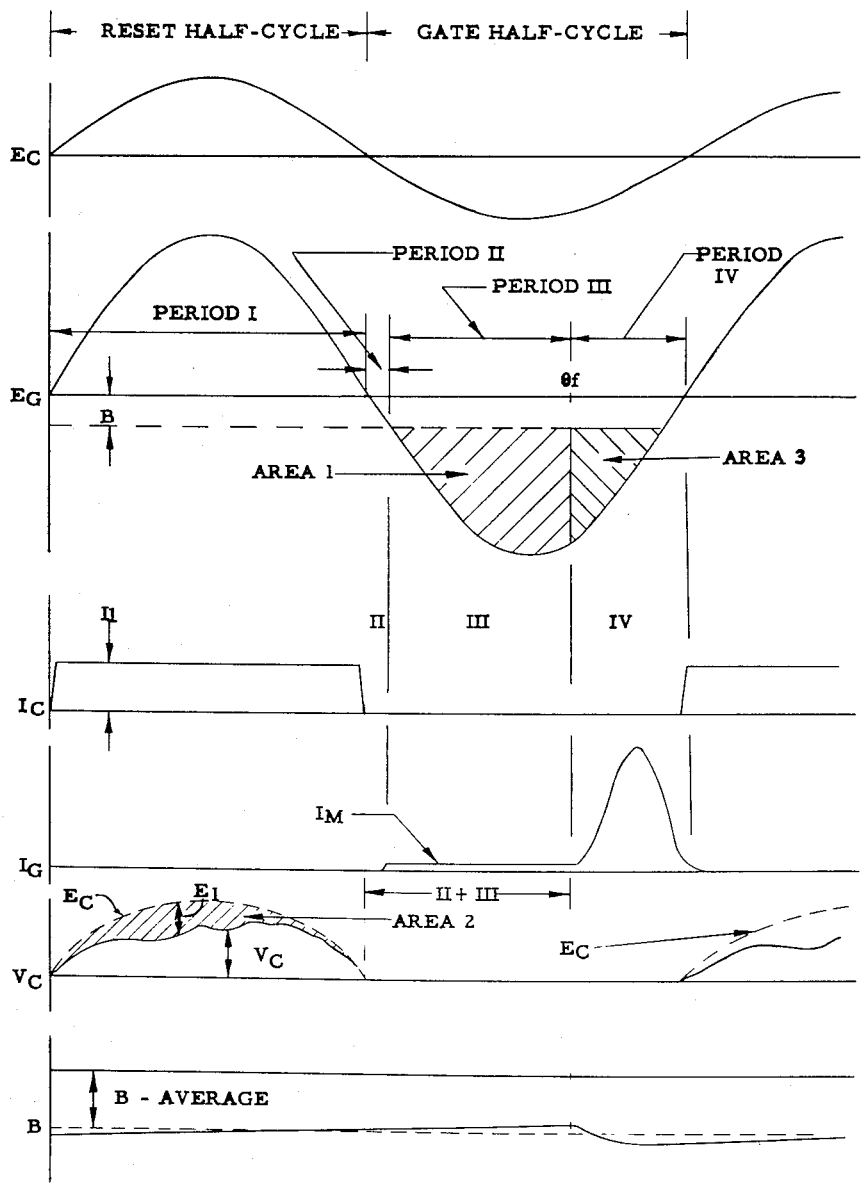
FIG. 4 WAVEFORMS FOR BIAS SUPPLY CIRCUIT 200

Dec. 19, 1961  E. L. WOODS  3,014,137
POWER AMPLIFIERS EMPLOYING SATURABLE REACTORS
Filed Oct. 17, 1958  7 Sheets-Sheet 4

INVENTOR.
ELVIN L. WOODS
BY

Dec. 19, 1961     E. L. WOODS     3,014,137
POWER AMPLIFIERS EMPLOYING SATURABLE REACTORS
Filed Oct. 17, 1958     7 Sheets-Sheet 6

INVENTOR.
ELVIN L. WOODS
BY
Lester S. Hecht

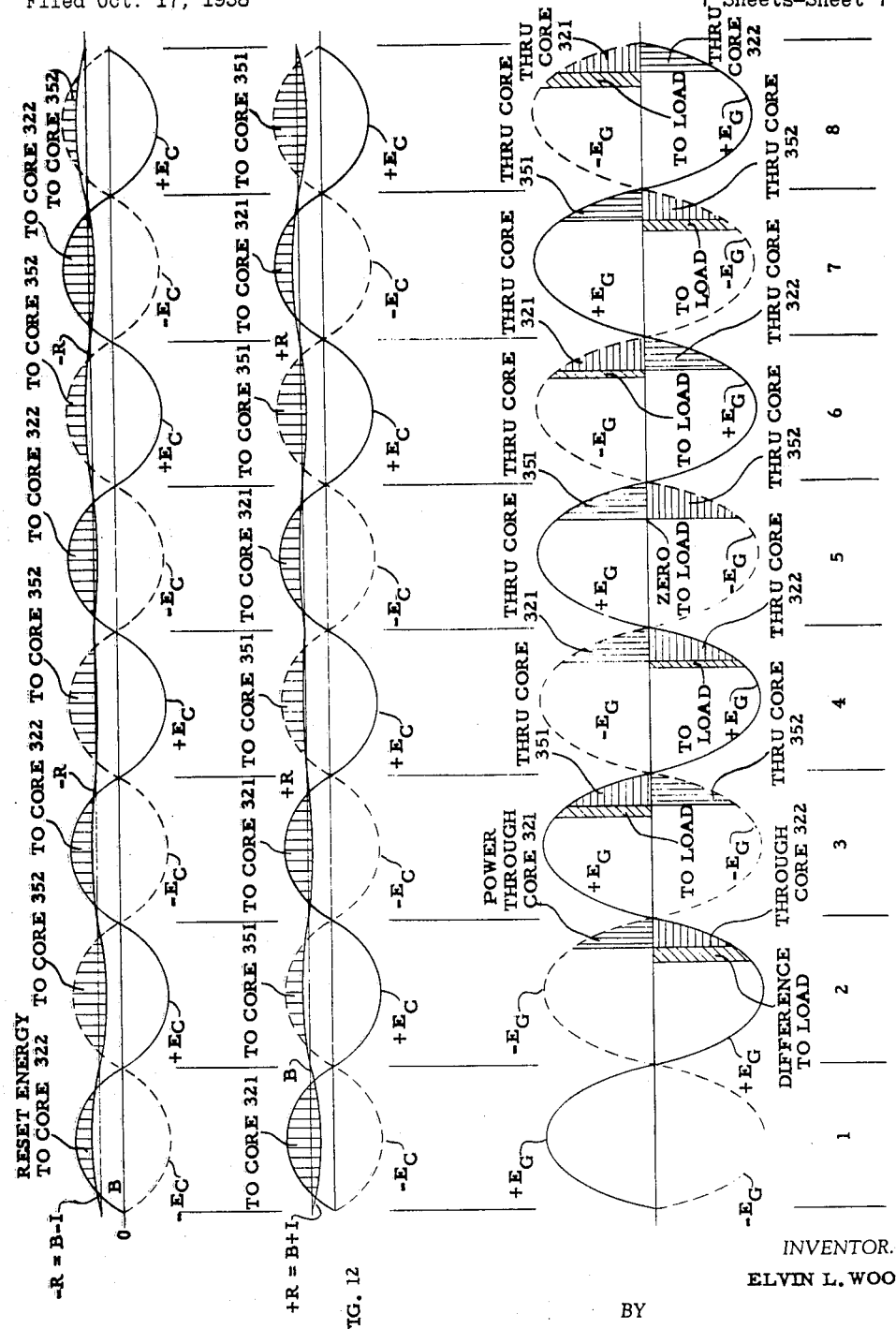

3,014,137
POWER AMPLIFIERS EMPLOYING SATURABLE REACTORS
Elvin L. Woods, Tustin, Calif., assignor, by mesne assignments, to Thompson Ramo Wooldridge Inc., Cleveland, Ohio, a corporation of Ohio
Filed Oct. 17, 1958, Ser. No. 767,894
4 Claims. (Cl. 307—88)

This invention relates to power amplifiers employing saturable reactors and, more particularly, to a system employing magnetic cores which is arranged to respond to an input signal and to supply current to a load in a quantity and in a direction, or polarity, corresponding to the sign and amplitude of the input signal.

Many types of power amplifier systems employing magnetic cores or saturable reactors are now known in the art. Typical examples of such systems are shown in a book entitled "Magnetic Amplifiers" by George M. Ettinger published in 1953 in Great Britain at the Pitman Press. As is evident in reviewing the various prior art circuits shown in this book, amplification is accomplished in the typical prior art arrangement by controlling the magnetic flux state of the core through a control winding. Control current is applied simultaneously to the core along with current from a main voltage source which is coupled to the load. The amplitude of the control current determines the effective impedance of the core and thus controls the amount of power transferred through the core to the load from the main source.

It is evident that the conventional technique requires that there must be some approximately linear relationship between the control signal level and the impedance change in the core in order to effect linear power amplification. However, this is difficult to achieve in practice.

The present invention contemplates a novel arrangement for employing a magnetic core to control power transfer where the control signal is not applied simultaneously with the main power source signal, but rather is utilized to reset the core to an unsaturated state. The amount that the core is reset or driven out of its saturation state is varied according to the input signal and substantially the same amount of energy is then required to restore the core to its saturation state. Thus the invention contemplates the control of the power transferred to a load by first controlling the amount of reset or out-of-saturation drive which occurs in the core and by then effecting power transfer through the core during the remaining portion of a cycle after the core has been saturated.

In general terms the invention contemplates an arrangement for supplying current to a load as a function of the phase and amplitude of an input signal, by first controlling the resetting of a core in an amount inversely corresponding to the phase and amplitude of the input signal and by then controlling the transfer of energy through the core during its saturation state to the load. Since the initial resetting of the core is essentially inversely responsive to the input signal and since the amount of energy transferred to the load during the power supplying period of operation is again inversely proportional to the amount of reset energy previously transferred to the core, the power which is supplied to the load is directly proportional to the input signal.

This general type of power control mentioned above is accomplished, according to the invention, by resetting each core included in a system as a function of the difference in amplitude between a sinusoidal control signal (referred to hereafter as signal $E_C$) and the combination (either sum or difference as discussed below) of the input signal and a regulated bias signal B. Bias signal B determines the operating point of the core and may be adjusted, as is more fully discussed below, to compensate for changes in the operating conditions (such as temperature) which prevail.

When power is to be supplied to a load in response to an input signal which may be either positive or negative, two cores are employed. Resetting of one core is controlled by the difference between control signal $E_C$ and a reset signal $+R$, defined as a sum of the input signal I and the regulated bias signal B ($R=B+I$). The second core is reset according to the difference between control signal $E_C$ and the difference combination of signals I and bias signal B ($-R=B-I$). The first core then is employed to supply positive current to the load after it has been reset and the second core is employed to supply negative current to the load, the total load current being then the difference between the current supplied by the two cores. As will be more fully discussed below, then, the resultant current supplied to the load is proportional to the phase and amplitude of the input signal.

The invention also contemplates several specific features which insure an accurate representation of the input signal in terms of output power. The bias signal is regulated through a supply circuit which also incorporates a magnetic core. This circuit utilizes a novel feedback arrangement whereby the output bias signal is a function of the magnetic characteristic of the core which is employed. In general terms, the amplitude of the bias supply signal is a function of the previous level of the same signal and of the amount of reset energy previously transferred to the core. If the magnetic characteristic of the core remains constant, output signal B also remains constant since this signal also regulates the amount of reset energy passed through the core, completing a feedback loop. Thus the bias supply of the invention is an important feature in insuring that the power amplification of the system is adjusted for changes in the character and operating condition of the cores employed.

Another feature contemplated by the invention is the balancing of the reset control signals against each other in driving two magnetic cores which supply current of opposite sign. According to the invention the reset signal generator may employ transistors arranged such that the drift in operating characteristic of one set of transistors, affecting the amount of reset energy transferred to one core, will also cause the transfer of a similar amount of energy to the core which passes opposing current to the load. Thus if the change in operating character of all transistors is the same, the net result is no output power change since the reset energy transferred to the two cores results in equal and opposite changes in currents passed to the load.

Accordingly it is an object of the invention to provide an improved arrangement for controlling the supply of current to a load through the use of a saturable reactor.

Another object of the invention is to provide a magnetic core system for controlling the power transferred to a load in accordance with the phase and amplitude of an input signal, the system being substantially independent of core characteristics.

A further object of the invention is to provide an improved device for the power amplification of an input signal, through the use of a magnetic core, where energy transfer is accomplished as a function of a previous amount of reset energy supplied to the core rather than a function of its magnetic characteristic.

Yet another object of the invention is to provide a bias supply circuit for a magnetic core power supplying system such that the bias level may be adjusted in a manner to compensate for the change in core characteristic in the power supply system, to insure substantial insensitivity to operating condition changes, such as temperature.

Still another object of the invention is to provide a reset signal generator which is arranged to drive a magnetic core power supplying system in a manner which substantially eliminates the effect of operating condition changes within the generator.

A specific object of the invention is to provide a balanced reset signal generator for a magnetic core power supply system wherein transistors are employed to produce the reset control signal and are arranged to balance the effect of changes in operating conditions.

The novel features which are believed to be characteristic of the invention, both as to its organization and method of operation, together with further objects and advantages thereof, will be better understood from the following description considered in connection with the accompanying drawing. It is to be expressly understood, however, that the drawings are for the purpose of illustration and description only, and are not intended as a definition of the limits of the invention.

FIG. 4 is a composite set of wave form diagrams illustrating the operation of the circuit of FIG. 3;

FIG. 12 is a composite set of wave form diagrams illustrating the operation of the circuit shown in FIG. 11.

Figure 1:
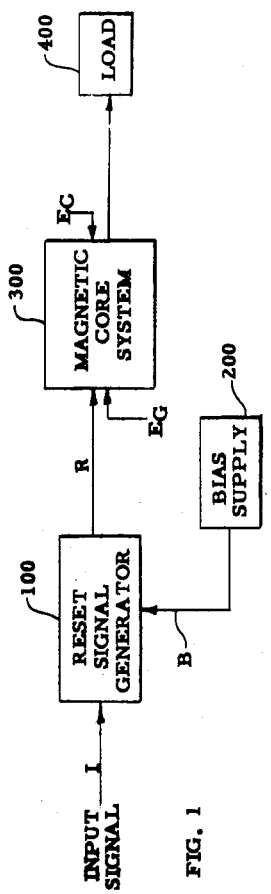
FIG. 1 is a block diagram illustrating the basic form of the invention.

Reference is now made to FIG. 1 where it will be noted that input signal I is supplied to a reset signal generator 100 which also receives a bias supply signal B from a bias supply 200. Generator 100 produces an output signal R which may be either the sum of signals I and B or the difference thereof depending upon the sign of the control desired, as is discussed in detail below. Signal R is then applied to the magnetic core power supplying system 300 shown in specific detail in FIG. 11 and determines the amount of reset energy which is effective as a function of the difference between control signal $E_C$ and reset signal R. The amount of reset energy transferred to a core in system 300 determines inversely the amount of energy transferred during the next cycle of a load supplying signal $E_G$.

Figure 2:
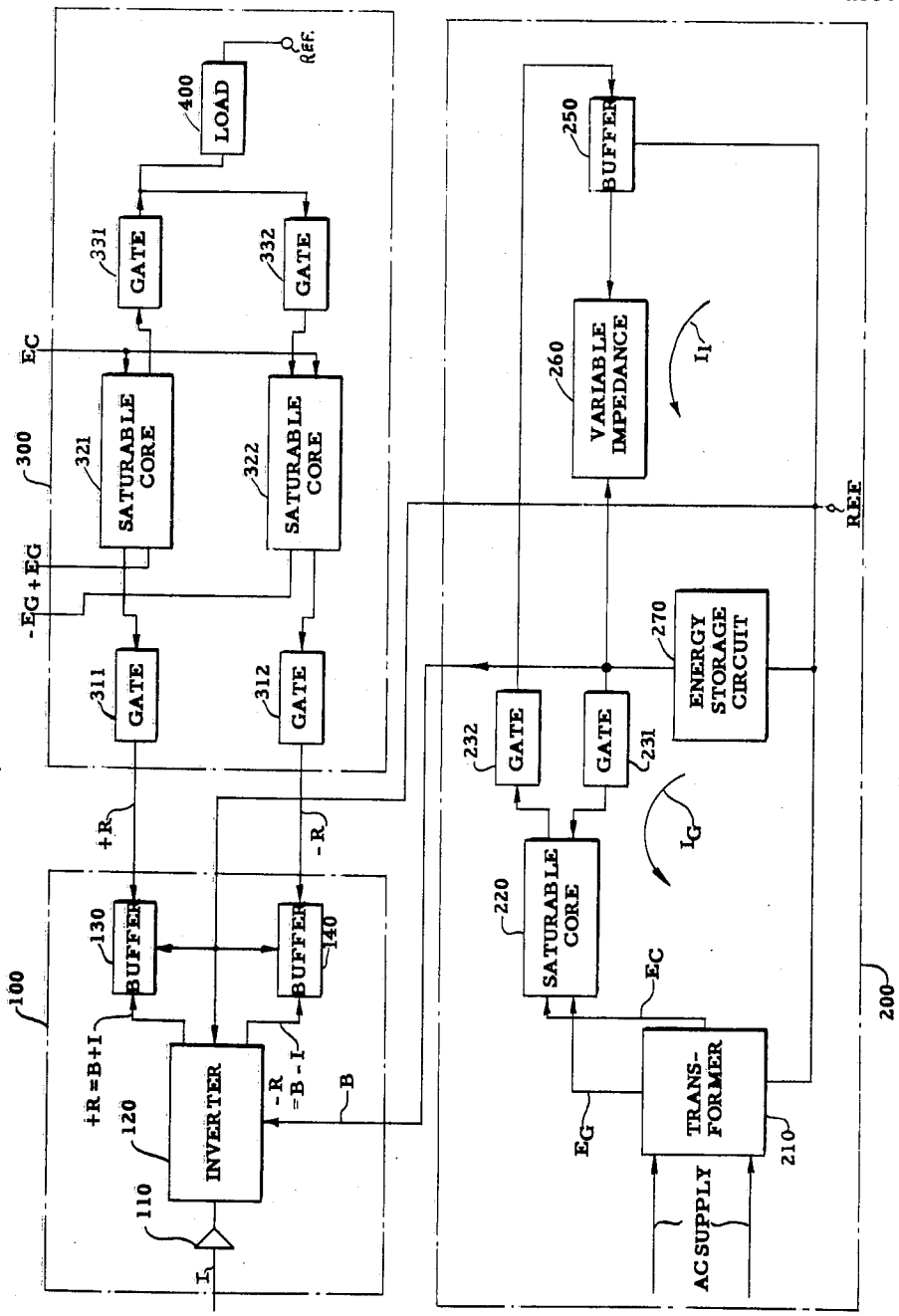
FIG. 2 is a block diagram illustrating one suitable arrangement for the embodiment of FIG. 1.

A suitable arrangement of the various components forming the system of FIG. 1 is illustrated in block diagram form in FIG. 2. It will be noted that input signal I is applied to an input amplifier 110 having its output coupled to an inverter stage 120. Inverter 120 also receives bias supply signal B from circuit 200 and produces two output signals referred to as $+R=B+I$ and $-R=B-I$. These signals are passed through respective buffer stages 130 and 140 to gates 311 and 312, respectively, in system 300. Gate 311 also receives a reset signal passed through saturable core 321 controlled by signal $E_C$. The amount of reset energy passed through core 321 is then controlled according to the level of signal $+R$, as is more fully explained below. In a similar manner gate 312 is coupled to core 322 so that signal $-R$ controls the amount of reset energy passed through core 322 under the control of signal $E_C$.

It will be noted that core 321 receives power signal $E_G$ controlling the passage of positive power through a gate 331 to load 400. The amount of this power is inversely proportional to the amount of reset energy previously transferred to core 321. In a similar manner signal $-E_G$ is applied to core 322 and controls the amount of negative power which is passed to load 400 through a gate 332. The system of FIG. 2 is self regulating with respect to changes in the operating conditions for cores 321 and 322. This is accomplished through the operation of bias supply 200 by varying output signal B with respect to the reference signal REF as a function of the change of the characteristic of a core 220 in supply 200 which is of the same type as core 321 and 322 in system 300.

In particular bias supply 200 comprises a transformer 210 which receives a suitable A.C. supply and provides A.C. signals $E_G$ and $E_C$. As in the operation of system 300 signal $E_C$ is employed to reset core 220 through a gate 232, a buffer stage 250, a variable impedance 260 and an energy storage circuit 270. The amount of reset current which may pass through core 220 is a function of the level of the signal retained in storage circuit 270.

During the power transfer cycle, negative energy is transferred to storage circuit 270 through a gate 231 and a second winding on core 220, through transformer 210. As is explained in further detail below, variable impedance 260 may be set to provide a desired operating signal level for bias signal B. This level then is maintained for a constant core operating condition since any tendency to increase the level of energy in circuit tends to increase the amount of reset energy transferred to core 220 and thus limits the amount of energy which may be transferred to circuit 270 during the next cycle. Thus the average value of the energy is regulated.

If the magnetic characteristic of core 220 changes such that a given amount of current has a changed effect in terms of the amount of power which may then be transferred, such as may occur with a change in temperature, the level of signal B is adjusted in a manner more fully explained below so that the operation of system 300 is also modified.

Another important feature of the arrangement of FIG. 2 is the fact that buffer stages 130 and 140 are utilized to control the operation of cores which supply opposing current. Thus if these stages are selected to have the same characteristic and if they change in operating condition by the same amount, this change is cancelled out in the operation of cores 321 and 322. The reason for this is that the changes cause corresponding changes in positive and negative currents from cores 321 and 322 which cancel each other with respect to the resultant current transfer to load 400. This will be more fully described below with reference to FIGS. 11 and 12.

Figure 3:
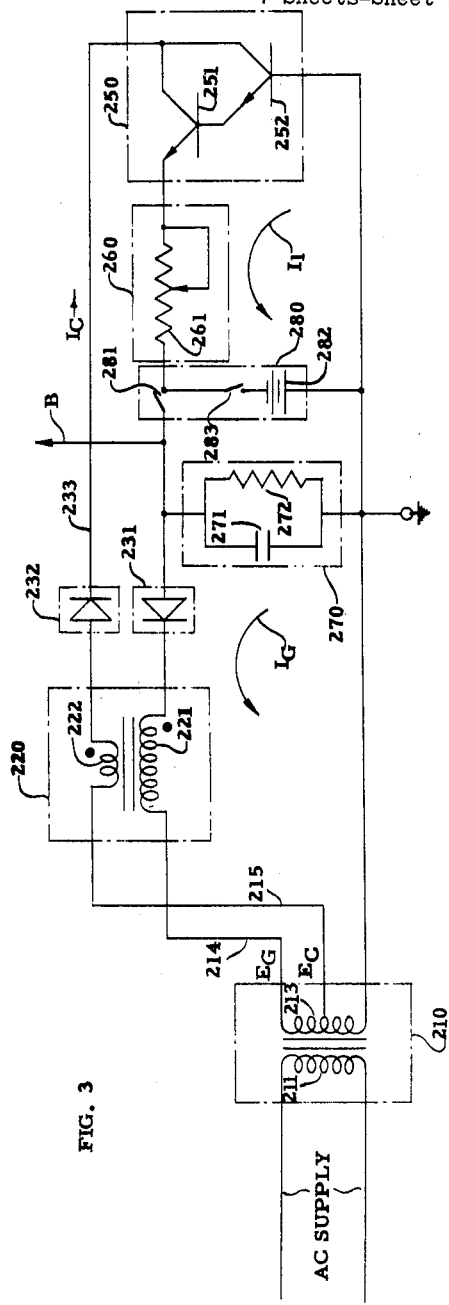
FIG. 3 is a schematic diagram illustrating a suitable form for bias supply 200, shown in FIG. 1.

Reference is now made to FIGS. 3 and 4 for a detailed description of the manner in which bias supply 200 is operative to provide a signal B which is regulated to compensate for changes in operating characteristics of the cores of system 300.

As indicated in FIG. 3 an A.C. signal is applied to the input winding 211 of transformer 210 and output winding 213 thereof supplies signal $E_G$ on lead 214 and signal $E_C$ on lead 215. Control signal $E_C$ is applied to the reset winding 222 of core 220 which passes current through a diode gate 232 when signal $E_C$ is positive. This positive current passes through lead 233 to buffer stage 250 shown as an illustrative arrangement to comprise transistors 251 and 252 connected in a conventional manner as a two stage emitter-follower with the base electrode of transistor 251 being connected to the emitter electrode of transistor 252 which has its base connected to a suitable reference potential such as ground. Buffer 250 is connected to variable impedance 260 which is coupled through calibrating stage 280 to energy storage circuit 270.

Calibrating stage 280 has not been previously shown since it does not form any part of the operating system of the invention. The purpose of this stage is to permit the opening of the feedback loop through switch 281 to energy storage circuit 270 and to then introduce a known reference source 282 through a switch 283. This source establishes a desired initial potential B and permits the adjusting of impedance 260, shown as including a variable resistor 261. Resistor 261 is then set to adjust the current which passes through core 220 to a desired operating level.

Energy storage circuit 270 is shown as comprising a conventional filter including a capacitor 271 and a resistor 272. When signal $E_G$ applied to power winding 221 on saturable core 220 is negative, diode gate 231 is permitted to conduct. The energy transfer cycle to discharge capacitor 271 does not begin, however, until the previous reset energy transferred through winding 222 to the core has been restored. Thus, in this manner, core 220 operates the same as cores 321 and 322 in FIG. 2.

The operation of bias supply circuit 200 can be considered to be divided into four basic periods as is shown in FIG. 4. Period I is designated as the reset half cycle and occurs each time control signal $E_C$ is positive causing diode 232 to conduct and current $I_C$ to flow to supply reset energy through winding 222. As is further developed below current $I_C$ is substantially equal to current $I_1$ which is determined by the setting of variable impedance 260 and the level of the signal retained by circuit 270.

If the voltage developed across buffer 250 is considered to be $V_C$ then the voltage across reset winding 222 of core 220 is approximately equal to signal $E_C - V_C$. This is assuming that the drop across diode 232 is negligible. Thus the shaded area in FIG. 4 shown associated with wave form $V_C$, and designated as $E_1$, is the energy component transferred to core 220 as a reset. During the reset cycle, capacitor 271 discharges at a relatively slow rate through resistor 272. This discharge continues throughout periods II and III during which time signal $E_C$ is negative as is also signal $E_G$. Diode 231 is backbiased during period II since the level of signal B is then still more negative than that of signal $E_G$. As soon as signal $E_G$ falls below the level of signal B, diode 231 conducts and energy is passed through winding 221 of core 220 tending to drive this core into saturation. Prior to the time core 220 reaches saturation, however, it presents a high impedance to the flow of current $I_G$ so that little or no energy is taken from capacitor 271 by this path. As soon as the reset energy previously transferred to core 220 is overcome by the return of energy through winding 221, however, core 220 becomes saturated, ending period III, and then energy previously stored in capacitor 271 is rapidly removed during period IV through diode 231 and lead 214. Thus a sharp increase in current $I_G$ will be noted during period IV and a rapid decrease occurs in the energy level of capacitor 271.

The relationship between current $I_C$ and current $I_1$ for the transistor arrangement of buffer circuit 250 may be expressed as follows:

$$I_C \doteq (\alpha_1 + \alpha_2 - \alpha_1.\alpha_2).I_1 \quad (1)$$

It is evident therefore that current $I_C$ is very nearly equal to current $I_1$ since $\alpha_1$ and $\alpha_2$ are approximately unity for any transistor.

When reset current passes through diode gate 232 and reset winding 222 the relationship of the various voltage drops may be expressed as follows:

$$E_C \sin \omega t = E_1 + I_C.R_C + E_2 + V_C \quad (2)$$

where $R_C$ is the impedance of winding 222 and $E_2$ and $V_C$ are the voltage drops across diode 232 and buffer 250, respectively.

In most cases voltages $E_2$ and $V_C$ are small and may be neglected. Since current $I_C$ is approximately constant for the entire reset period, a constant magnetomotive force (mmf.) is applied to the core. The rate of change of flux depends upon the amount of mmf. being applied by transformer 210 and the amount of current supplied thereby. The voltage $E_1$, proportional to the rate of change of core flux is induced into reset winding 222, in a direction causing current to flow through diode gate 232. This induced voltage is related to the voltage across winding 221 (referred to hereinafter as $E_3$) by the relationship:

$$E_3 = E_1.Ng/Nc \quad (3)$$

Where Ng are the turns in winding 221 and Nc are the turns in winding 222. If $/E_3/ > /E_G \sin \omega t/ + /B/$, then diode 232 conducts and a portion of current $I_C$ is required to supply this load. This leaves a small mmf. applied to the core and a resulting smaller voltage $E_1$ thereacross. This load, reflected into winding 221, will generally be very large and thus limits the maximum value that voltage $E_1$ can assume according to Equation 4 below:

$$E_1 \max = (/E_G \sin \omega t/ + /B/).Nc/Ng \quad (4)$$
(During period I)

When core materials are utilized which have substantially square hysteresis loops, the magnetic field strength due to $I_C$ must exceed the D.C. coercive of force of material before any core flux reset can occur. The minimum value for $I_C$ for any reset to occur is given by Equation 5 below:

$$I_C \min = HC_{DC}.L/.\pi.Nc \quad (5)$$

where $HC_{DC}$ is the D.C. coercive force of the material and L is the effective length of the magnetic path.

The maximum $I_C$ required to get complete reset is given by Equation 6 below:

$$I_C \max = HC_{AC}.L/.4\pi.Nc \quad (6)$$

where $HC_{AC}$ is the dynamic coercive force of the material for sinusoidal flux at supply frequency.

Figure 5:
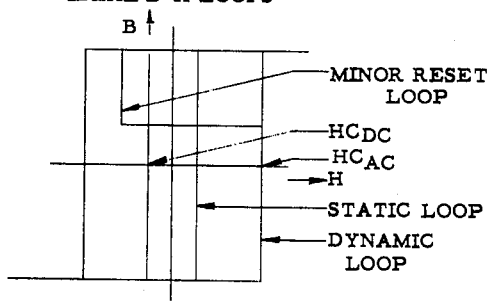
FIG. 5 is a graph illustrating ideal B—H hysteresis loops for a magnetic core.

FIGURE 5 shows the dynamic and static hysteresis loops of an ideal material and is believed to be self explanatory in view of the above discussion.

Figure 6:
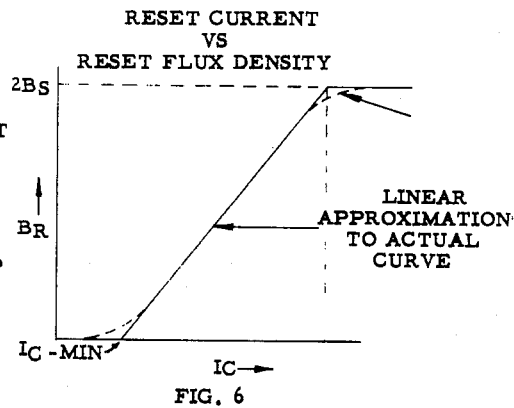
FIG. 6 is a graph illustrating how flux density varies for a core, with changes in reset current.

The relationship between reset current $I_C$ and the reset flux density is shown in FIG. 6 where the dashed line shows a typical measured characteristic of a square-loop core material. The solid line in FIG. 6 is a linear approximation of the actual curve which is given by Equation 15 below. Once $/E_G \sin \omega t/ > /B/$ during the gate half cycle, diode gate 231 conducts a small amount of magnetizing current $I_M$. The magnitude of current $I_M$ for this period is given by Equation 7 below:

$$I_M = I_G \doteq HC_{AC}.L/.4\pi Ng \quad (7)$$
(During period III)

In general current $I_M$ contributes a negligible charge into capacitor 271 since $I_M$ is much less than $I_1$. A voltage appears across winding 222 which begins to return the core flux density towards positive saturation. This voltage is given by Equation 8.

$$E_3 = /E_G \sin \omega t/ - (/B/ + I_M.R_G) \quad (8)$$

where $E_5$ is the voltage drop across diode 231 and $R_G$ is the impedance of winding 221 so that $I_M.R_G$ is the voltage drop thereacross.

When the volt-seconds per turn due to the voltage $E_3$ across winding 221 is equal to the volt-seconds per turn due to the voltage $E_1$ during the reset period, the core flux density has returned to saturation with period III ending and period IV beginning. Once the core flux saturates, the core winding appears as a small inductance and a gate current builds up as shown in FIG. 4. If the ripple voltage across capacitor 271 and the diode drop across diode 231 is small as compared to output voltage B, then current $I_G$ may be determined from Equation 9 below:

$$/E_G \sin \omega t/ = I_G.R_G + L_S.dI_G/dt + /B/ \quad (9)$$

In order to keep the ripple on bias supply signal B small, the time constant capacitor 271 and resistor 272 should be large compared to a period of one cycle of the supply voltage. Signal B will then decrease approximately linearly with time from the end of period IV to the beginning of the next period IV. The charge lost by capacitor 271 during this time, periods I through III, must equal the charge gained by capacitor 271 during period IV. An expression may be written equating the charge flowing into energy storage circuit 270 and a charge flowing into the load since the average charge on capacitor 271 is constant for steady state conditions. This expression is given by Equation 10 below:

$$\int_{t_1}^{t_2} I_G dt = 2\pi \text{Baverage}/R_L\omega. \quad (10)$$

where $t_1 = \theta_f/\omega$ and $t_2 =$ end of period III where $\theta_f$ is the core firing angle or saturation angle, and Baverage is the average value of signal B.

To simplify the analysis it may be assumed that the inductance $L_S$ may be neglected and that signal B is small compared to the average value of signal $E_G$ during period III. As indicated in FIG. 4, the volt-seconds represented by area 1 referred to winding 221 by the turns ratio must equal the volt-seconds represented by area 2. Hence:

$$\text{Area } 1/Ng = \text{Area } 2/Nc \quad (11)$$

If the ripple voltage on signal B is small compared to the absolute value of signal D, then the volt-seconds per ohm represented by area 3 of FIG. 4 divided by the impedance of winding 221 ($R_G$) represents the charge flowing into energy storage circuit 270 as represented by Equation 10 above. Hence:

$$\text{Area } 3/R_G = \int_{t_1}^{t_2} I_G dt \quad (12)$$

where $t_1 = \theta_f/\omega$; and $t_2 =$ end of period IV.

Equation 13 and 14 below specify the volt-seconds represented by areas 1 and 3 of FIG. 4:

$$\text{Area } 1 = E_G (1 - \cos\theta_f)/\omega - B.\theta_f/\omega \quad (13)$$

$$\text{Area } 3 = E_G (1 + \cos\theta_f)/\omega - B.(\pi - \theta_f)/\omega \quad (14)$$

Considering again FIG. 6 we may then write:

$$B_R = \frac{(I_C - I \min) 2 B_S}{I_C \max - I_C \min} \quad (15)$$

The change in flux density of a core is related to the voltage "e" across the core windings of N turns as given by Equation 16 below:

$$\Delta F = 10^8 / A_C N . \int_0^{t_1} e \, dt \quad (16)$$

where $\Delta F$ is the change in flux density and $A_C$ is the effective cross sectional area.

From Equations 10, 13, 14 above we may then derive the following equation:

$$B = R_L.\omega.[E_G.(1 + \cos\theta_f)/\omega - B.(\pi - \theta_f)/\omega] R_G.2\pi \quad (17)$$

And then from Equations 11, 13, 15 and 16 above we can derive an expression for current $I_C$.

$$I_C = 10^8 / A_C.Ng.\omega.\left(\frac{I_C \max = I_C \min}{2B_S}\right)$$
$$[E_G.(1 - \cos\theta_f) - B.\theta_f] \quad (18)$$

Figure 8:
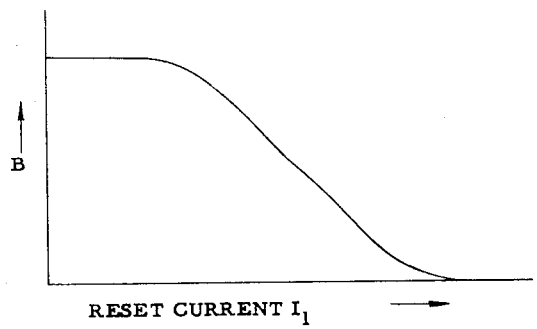
FIG. 8 is a graph showing the variation of bias signal B with changes in reset current $I_1$.

From Equations 17 and 18 then we may plot bias signal B versus various values for current $I_C$ by eliminating the term $\theta_f$. This plot is shown in FIG. 8. From this figure it may be seen that a large portion of the curve is nearly linear. The effect of any saturated inductance, $L_S$, can be estimated by noting that $L_S$ limits the maximum rate of change of current $I_G$ at the beginning of period IV. Hence, the core would have to saturate sooner to get the same charge into capacitor 271. This would require less core reset and hence a smaller $I_C$. The inductance will also tend to keep current $I_C$ flowing after $/E_G \sin\omega t/ < /B/$.

Figure 7:
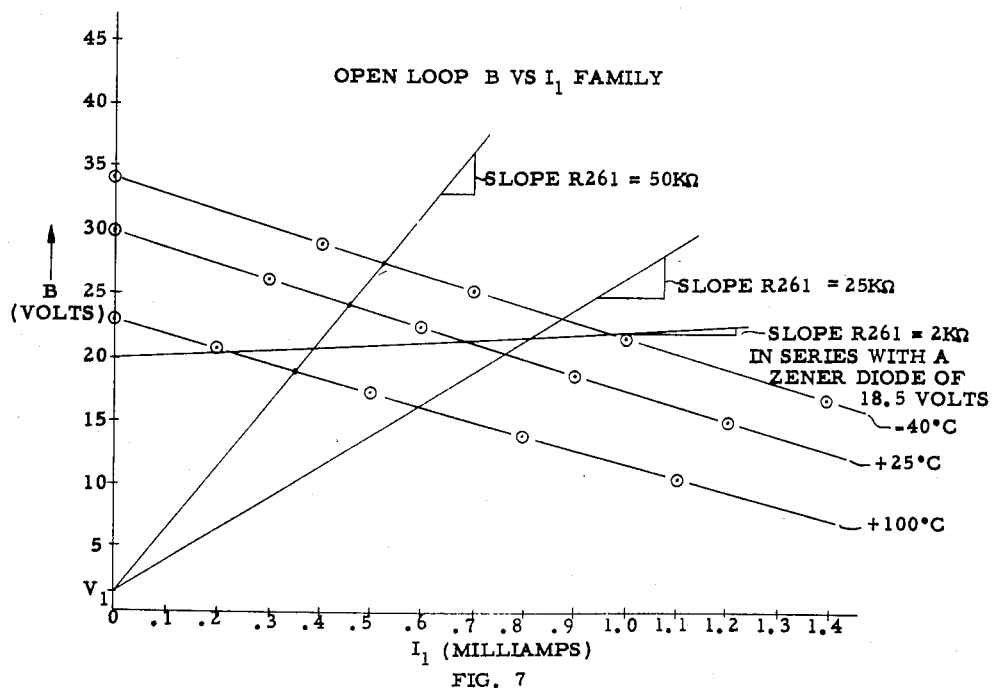
FIG. 7 shows a family of graphs for bias signal B vs. current I, for various operating temperatures of a core.
Figure 9:
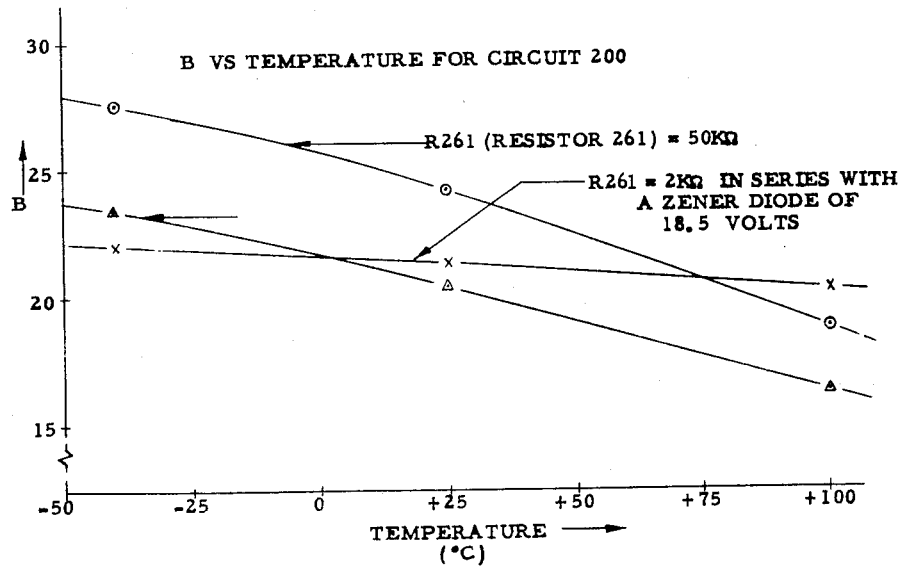
FIG. 9 is a graph showing the variation of bias signal B for changes in temperature, for various bias supply load conditions.

A typical example as to how the bias supply provided by the invention automatically adjusts for change in operating conditions is illustrated in FIGS. 7 and 9. In FIG. 7 a set of curves is shown for the circuit of FIG. 3 where switch 281 is open and switch 283 is closed. Current $I_1$ is plotted for the temperature conditions $-40°$ centigrade, $+25°$ centigrade, and $+100°$ centigrade, for various values of voltage B which may be adjusted by utilizing different source values for battery 282.

The data of FIG. 7 then may be translated into the graph of FIG. 9 where bias supply signal B is shown for various temperatures. It will be noted then that level of signal B calls for rising temperature in order to compensate for the fact that, as the core temperature rises, the amount of current $I_C$ is decreased for a given output supply B. Thus the decrease in supply signal B automatically compensates for the changed operating conditions of the cores in system 300 and maintains the amount of reset energy effectively constant for a fixed input signal level.

Figure 10:
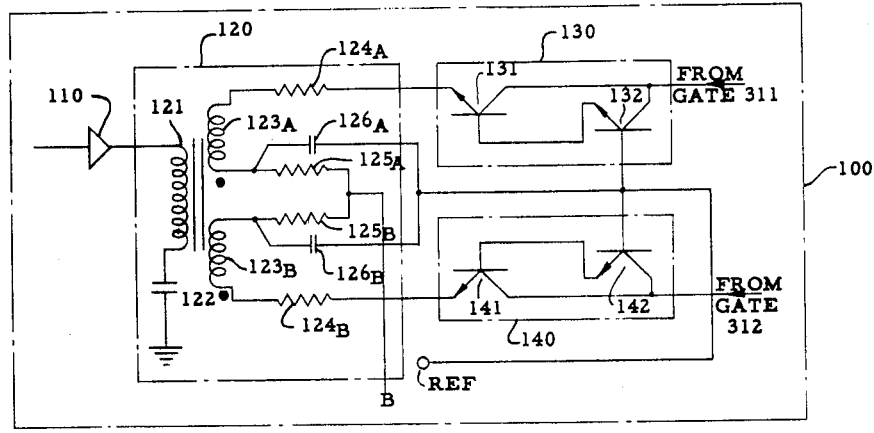
FIG. 10 is a schematic diagram of a suitable form of circuit 100 shown in FIGS. 1 and 2.

A schematic diagram of the suitable arrangement for combining supply signal B with input signal I to generate the appropriate reset signals +R and −R is shown in FIG. 10. In this figure input signal I is applied to an amplifier 110 which is connected to the primary winding 121 of a transformer 120 which constitutes inverter 120 of FIG. 2. The other end of winding 121 is coupled through a suitable capacitor 122 to a reference potential such as ground. The secondary section of inverter 120 comprises a first winding 123$_A$ having one end connected to an output resistor 124$_A$ and its other end connected to receive signal B through an adding resistor 125$_A$. Resistor 125$_A$ is bypassed by a suitable capacitor 126$_A$ which is connected to a reference potential lead 127. In a similar manner, the output section of inverter 120 includes a second winding 123$_B$ having one end connected to a resistor 124$_B$ to provide an output signal, and its other end connected through a resistor 125$_B$ to receive bias signal B, resistor 125$_B$ being bypassed by suitable capacitor 126$_B$ coupled to the reference signal lead 127.

Output resistors 124$_A$ and 124$_B$ are then connected to buffer stages 130 and 140 shown as each comprising a pair of series-connected emitter-follower transistors. In circuit 130 a transistor 131 has its emitter electrode connected to resistor 124$_A$ and its base connected to the emitter of a second transmitter 132. The collector electrodes of transistors 131 and 132 are coupled together and constitute the input circuit for buffer 130 which is adapted to pass the signal received through gate 311 to resistor 124$_A$. In a similar manner transistors 141 and 142 in buffer 140 are connected to pass the output signal of gate 312 to resistor 124$_B$.

In operation, a positive input signal I causes the undotted end of winding 123$_A$ to become positive in an amount corresponding to signal I and the sum therewith of signal B introduced through resistor 125$_A$. This sum signal is referred to as the reset control signal +R and controls the amount of current which is passed through buffer stage 130. Thus signal I, when positive, controls the amount of current which may pass through saturable core 321.

In a similar manner when input signal I is positive a negative signal appears at the dotted end of winding 123$_B$ which is effectively subtracted from bias signal B applied to resistor 125$_B$. This then constitutes reset control signal −R which controls the amount of current passed through gate 312.

Figure 11:
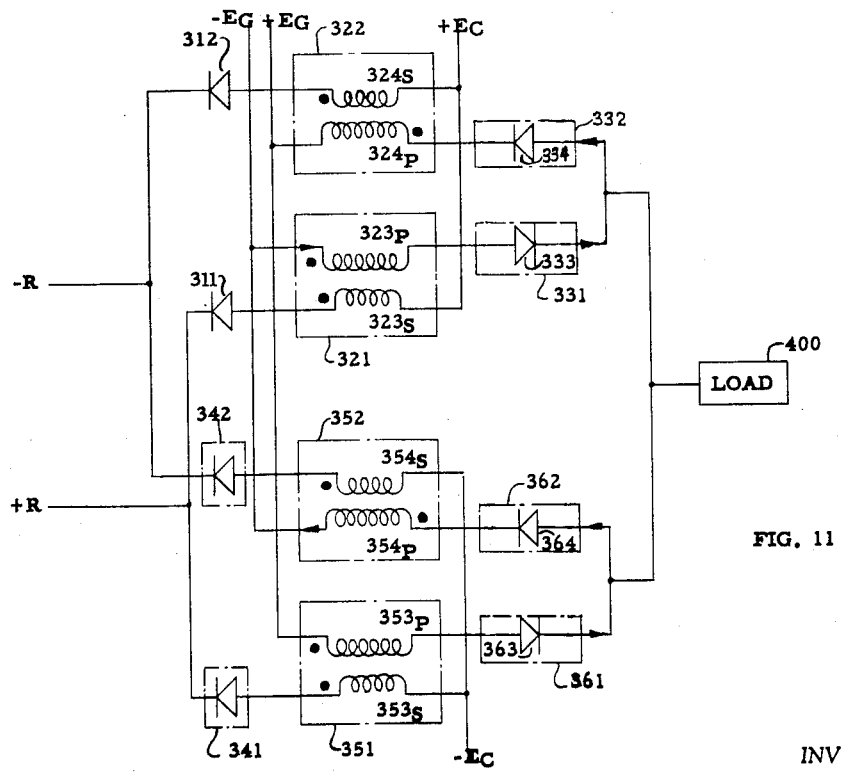
FIG. 11 is a schematic diagram of a suitable arrangement of a system 300 employing four magnetic cores, to supply full-wave positive or negative power to a load.

The manner in which reset signal generator 100 is effective to control the operation of system 300 will be more fully understood after FIG. 11 is considered in detail below.

In FIG. 11, reset control signal +R is applied to a diode gate 311 which is coupled through reset winding 323$_S$ of saturable core 321. The other end of winding 323$_S$ receives control signal E$_C$. As previously pointed out, the amount of power transferred through saturable core 321 is inversely proportional to the amount of reset accomplished through winding 323$_S$. This power is transferred when signal —E$_G$ is positive causing current to flow through power winding 323$_P$ and gate 331, (shown as comprising diode 333). In a similar manner, signal —R is applied through gate 312 to reset winding 324$_S$, the other end of which receives control signal E$_C$. Power then is transferred in a negative sense to the load through gate 332, comprising diode 334. Positive current may be assumed to pass through gate 332 from load 400 through power winding 324$_P$, when signal E$_G$ applied to the other end of winding 324$_P$ is negative. A similar arrangement of cores and gates is included in FIG. 11 in order to accomplish full wave control of load 400. In this section of the system, reset control signal +R is applied through a diode gate 341 to reset winding 353$_S$ of core 331 which receives signal —E$_C$ at its other end. Reset control signal —R is applied through diode gate 342 to one end of reset winding 354$_S$ of core 352 the other end of which also receives signal —E$_C$. Power winding 353$_P$ of core 351 receives signal +E$_G$ at one end and has its other end coupled through diode gate circuit 361 to load 400. Power winding 354$_P$ of core 352 has one end for receiving signal —E$_G$ and the other end is coupled to diode gate 362.

The operation of the magnetic core system can best be described with reference to FIG. 12. As indicated in FIG. 12 the system operates as a series of successive half cycles. During each half cycle one pair of cores is reset while the other pair of cores is transferring positive or negative power to the load, the resultant being the energy difference therebetween. Thus during the first half cycle of operation (designated as period I) cores 321 and 322 are reset under the control of signals +R and —R, respectively. These cores are then operative during the successive half cycle of operation to pass positive and negative power to the load in inverse proportion to the amount of reset energy previously transferred thereto. Thus after the first half cycle of operation core 321, having received a larger amount of reset energy than core 322 passes less positive current to core 400 than core 322 passes negative current. Consequently there is a negative difference supplied to the load which is therefore directly proportional to the sign and amplitude of input signal I, which was assumed as an example to have been negative during the first half-cycle. A similar operation then occurs during the second half-cycle with respect to the resetting of cores 351 and 352. In this case signal +R is positive with respect to bias signal B and signal —R is negative so that the energy transferred to core 351 is of similar magnitude to that previously transferred to core 322, and energy transferred to core 352 is similar in amount to that previously transferred to core 321. Thus during the third half-cycle of operation the positive current passing through core 351 exceeds the negative current passing through core 352, so that the resultant difference to the load is positive. It will be noted that the amount of the difference is smaller in this case in view of the reduction in amplitude of signal I.

This type of operation continues throughout FIG. 12. It will be noted that a phase shift occurs during half-cycles 4 and 5, where input signal I is substantially zero. Thus during half-cycle 5 the energy transferred through core 351 to the load and that transferred to core 352 to the load are substantially equal so that the resultant difference is approximately zero. During the following operation the phase of signal I is approximately 180° out of phase with respect to its initial state during the first half-cycle, so that half-cycle periods 6, 7, and 8 appear similar, but 180° out of phase with cycles 4, 3, and 2, respectively.

From the foregoing description it should now be apparent that the present invention provides an improved system for supplying power to a load through a saturable reactor. It has been demonstrated that by adjusting the level of the reset control signal (R) according to the invention through bias control circuit 200, compensation may be made for changes in operating condition such as temperature.

The feature of reset control circuit 100 has also been described and illustrated in detail above whereby variations in the operating level of the elements therein (illustrated as transistors) are balanced against each other and eliminated by controlling opposing load currents.

It will be understood, of course, that while specific circuits have been illustrated for the purpose of explanation, the invention is generic in nature to a broad class of magnetic core systems which operate upon the reset energy principle to control the passage of power to a load in accordance with the phase and amplitude of an input signal. It is expected that many variations will occur to those skilled in the art without departing from the scope of the appended claims.

I claim:

1. A circuit responsive to an input signal to transfer power to a load, comprising: a pair of saturable reactors each having a power winding and a reset winding; a control signal source connected to the reset windings of said pair of saturable reactors; a power signal source connected to the power windings of said pair of saturable reactors; an input signal source; a bias signal source; a generator to provide a reset signal as a function of the signals from said input signal source and said bias signal source; means to connect the reset signal from said generator to the reset windings of said pair of saturable reactors; a load; and, means to connect the power windings of said pair of saturable reactors to said load.

2. A circuit responsive to an input signal to transfer power to a load, comprising: a pair of saturable reactors each having a power winding and a reset winding; a control signal source connected to the reset windings of said pair of saturable reactors; a power signal source connected to the power windings of said pair of saturable reactors; an input signal source; a bias signal source; a generator to provide a reset signal as a function of the signals from said input signal source and said bias signal source; means to connect the reset signal from said generator to the reset windings of said pair of saturable reactors, said means including a pair of similarly poled diodes; a load; and, means to connect the power windings of said pair of saturable reactors to said load, said means including a pair of oppositely poled diodes.

3. A circuit responsive to an input signal to transfer power to a load, comprising: a pair of saturable reactors each having a power winding and a reset winding; a control signal source connected to the reset windings of said pair of saturable reactors; a power signal source connected to the power windings of said pair of saturable reactors; an input signal source; a bias signal source; a generator to provide a pair of reset signals as a function of the signals from said input signal source and said bias signal source; means to connect the pair of reset signals from said generator one to each reset winding of said pair of saturable reactors, said means including a pair of similarly poled diodes, one diode connected to each reset winding; a load; and, means to connect the power windings of said pair of saturable reactors to said load, said means including a pair of oppositely poled diodes, one diode connected to each power winding.

4. A circuit responsive to an input signal to transfer power to a load, comprising: a pair of saturable reactors each having a power winding and a reset winding; a control signal source connected to the reset windings of said pair of saturable reactors; a power signal source connected to the power windings of said pair of saturable reactors; an input signal source; a bias signal source; an adder to provide a reset signal as the sum of the signals from said input signal source and said bias signal source; means to connect the reset signal from said adder to the reset windings of said pair of saturable reactors; a load; and, means to connect the power windings of said pair of saturable reactors to said load.

References Cited in the file of this patent
UNITED STATES PATENTS

| | | |
|---|---|---|
| 2,057,463 | West | Oct. 13, 1936 |
| 2,067,143 | Logan | Jan. 5, 1937 |
| 2,817,770 | Oppen | Dec. 24, 1957 |
| 2,862,112 | Ringelman | Nov. 25, 1958 |
| 2,875,351 | Collins | Feb. 24, 1959 |
| 2,904,744 | De Lalio | Sept. 15, 1959 |
| 2,923,835 | Black | Feb. 2, 1960 |

UNITED STATES PATENT OFFICE
CERTIFICATE OF CORRECTION

Patent No. 3,014,137                      December 19, 1961

Elvin L. Woods

It is hereby certified that error appears in the above numbered patent requiring correction and that the said Letters Patent should read as corrected below.

Column 4, line 61, after "A.C." insert -- supply --; column 7, line 58, the right-hand portion of the equation should read as shown below instead of as in the patent:

$$\omega]/R_G \cdot 2\pi$$

Signed and sealed this 8th day of May 1962.

(SEAL)
Attest:

ERNEST W. SWIDER                      DAVID L. LADD
Attesting Officer                         Commissioner of Patents